United States Patent [19]
Semen

[11] Patent Number: 6,126,863
[45] Date of Patent: Oct. 3, 2000

[54] LOW DUST BALANCED HARDNESS ANTIOXIDANT AGGLOMERATES AND PROCESS FOR THE PRODUCTION OF SAME

[75] Inventor: John Semen, Baton Rouge, La.

[73] Assignee: Albemarle Corporation, Richmond, Va.

[21] Appl. No.: 09/204,121

[22] Filed: Dec. 2, 1998

[51] Int. Cl.[7] .......................... C09K 15/08; C09K 15/14; C09K 15/24; B32B 5/16; B29B 9/00
[52] U.S. Cl. ................. 252/404; 252/400.1; 252/400.23; 252/400.24; 252/401; 425/402; 264/6
[58] Field of Search ............................ 252/400.1, 400.23, 252/400.24, 401, 404; 428/402; 264/6

[56] References Cited

U.S. PATENT DOCUMENTS

| | | | |
|---|---|---|---|
| 4,957,956 | 9/1990 | Neri et al. | 524/120 |
| 5,240,642 | 8/1993 | Neri et al. | 252/399 |
| 5,597,857 | 1/1997 | Thibaut et al. | 524/400 |
| 5,846,656 | 12/1998 | Dunski | 428/402 |

*Primary Examiner*—Jill Warden
*Assistant Examiner*—Monique T. Cole
*Attorney, Agent, or Firm*—Philip M. Pippenger

[57] ABSTRACT

The present invention is directed to a process for the production of agglomerates of a sterically hindered phenol antioxidant such that the agglomerates have a balanced hardness so as to resist abrasion during conveyance yet being readily dispersed in a host plastic. Such novel agglomerates are achieved through the use of a processing aid consisting of a solvent selected from the group consisting of methylene chloride, chloroform, toluene, acetone, methylethylketone, xylene, cyclohexane, styrene, methylcyclohexane and hexane having at least one gram of antioxidant dissolved therein per 100 mL of solvent and from about 20 to about 50 weight percent of an alcohol of the formula ROH wherein R is an alkyl group of 1 to 8 carbon atoms and thereafter using the resulting solution of solvent, alcohol, and antioxidant to form a paste of additional portions of the antioxidant which is thereafter agglomerated and dried.

The present invention further provides a novel process for controlling the hardness of an agglomerated sterically hindered phenol antioxidant or a mixture of such antioxidant and a secondary phosphite antioxidant through the use of a processing aid wherein there is employed from 20 to about 50 weight percent of an alcohol of the formula ROH and wherein the hardness of the resulting agglomerate is inverse to the amount of alcohol employed in the system.

17 Claims, No Drawings

LOW DUST BALANCED HARDNESS ANTIOXIDANT AGGLOMERATES AND PROCESS FOR THE PRODUCTION OF SAME

FIELD OF THE INVENTION

The present invention relates to low dust agglomerates of a sterically hindered phenol antioxidant having a balanced hardness and to a process for the production of such balanced hardness agglomerates.

BACKGROUND OF THE INVENTION

Organic polymers (plastics) and in particular polyolefins, such as polyethylene and polypropylene, require the addition of various additive systems thereto in order both to be processed and to retain long term stability in order to retain desired service properties. In addition to the damaging influence of light and heat, residues of the catalyst system used in the production of such plastics are also detrimental. To overcome such difficulties, a wide variety of substances are known in the art for use as additives and stabilizers. In many instances a mixture of such additives is employed.

One commonly used additive system is that comprising a sterically hindered phenol antioxidant which is employed either alone or in combination with a secondary phosphite antioxidant and optionally an acid neutralizer. Since such antioxidants are in the powder form, there is presented a disadvantage in the use of same in an additive system due to the problem of dusting as well as having a tendency toward separation and thereby proving difficult to meter. Thus, there exists a need for a commercial form of antioxidant additives which does not have these disadvantages.

While a variety of approaches have been made to achieve the production of a low dust additive system, such processes have generally employed systems that introduce into the additive package a further component such as calcium stearate, water, or other binders. Such a system is that disclosed in U.S. Pat. No. 5,597,857 wherein at least 10 percent by weight of calcium stearate is employed as a binding agent in the formation of additive granules.

Other prior art systems using mixing processes or compacting are known, but in most cases the resulting commercial forms do not have adequate mechanical properties.

In addition to an additive package or agglomerate having adequate mechanical strength or hardness so as to have sufficient abrasion resistance to preclude dust formation, such an agglomerate needs also to have a balanced hardness which will permit it to be readily processed in the systems wherein the additive package is being dispersed into the host plastic.

Accordingly, there remains a need for a balanced strength antioxidant additive system which possesses adequate mechanical strength to avoid mechanical abrasion and dust formation, while at the same time having a balanced hardness which will permit it to be readily dispersed in the host plastic while at the same time avoiding the introduction of undesired components.

Also, there is a need for an additive package exhibiting less hardness than possessed by an agglomerated form which will permit its even being more conveniently dispersed into the host plastic.

It is thus an object of the present invention to provide a process for the production of a novel agglomerate of a sterically hindered phenol antioxidant which will avoid the introduction of undesired components into the additive system.

Another object of this invention is to provide a novel sterically hindered phenol antioxidant system in an agglomerate form which will have a balanced hardness so as to provide adequate abrasion resistance yet being readily dispersed in a host plastic.

Other aspects, objects, and the several advantages of this invention will become apparent from the following specification and claims.

SUMMARY OF THE INVENTION

In accordance with one embodiment of the present invention, I have discovered that an agglomerate of a sterically hindered phenol antioxidant having a balanced hardness so as to provide adequate abrasion resistance while readily dispersable in a host plastic can be produced by a process which comprises:

(a) forming a processing aid by dissolving a first portion of said sterically hindered phenol antioxidant in a solvent system consisting essentially of at least one solvent of the group consisting of methylene chloride, chloroform, toluene, acetone, methylethylketone, xylene, cyclohexane, styrene, methylcyclohexane, and hexane and an alcohol of the formula ROH wherein R is an alkyl group of from 1 to 8 carbon atoms, said alcohol being present in amounts in said solvent system such that as the amount of said alcohol is increased, there is achieved a decrease in the balanced hardness of the agglomerate of said sterically hindered phenol antioxidant formed therewith, and as the amount of said alcohol is decreased there is achieved an increase in the balanced hardness of the agglomerate of said sterically hindered phenol antioxidant formed therewith;

(b) contacting a second portion of said sterically hindered phenol antioxidant with an amount of said processing aid consisting essentially of solvent, alcohol, and stericaly hindered phenol antioxidant sufficient to form a paste thereof;

(c) agglomerating the resulting paste of said sterically hindered phenol antioxidant so as to form agglomerates thereof; and (d) drying the resulting agglomerates of said sterically hindered phenol antioxidant so as to form dried agglomerates thereof having a balanced hardness which is inverse to the amount of alcohol present in the processing aid.

In accordance with another embodiment of this invention, I have discovered that an agglomerate of a sterically hindered phenol antioxidant and a secondary phosphite antioxidant having a balanced hardness so as to provide adequate abrasion resistance while being readily dispersable in a host plastic can be produced by a process which comprises:

(a) forming a processing aid by dissolving a first portion of said sterically hindered phenol antioxidant in a solvent system consisting essentially of at least one solvent of the group consisting of methylchloride, chloroform, toluene, acetone, methylethylketone, xylene, cyclohexane, styrene, methylcyclohexane, and hexane and an alcohol of the formula ROH wherein R is an alkyl group of from 1 to 8 carbon atoms, said alcohol being present in amounts in said solvent system such that as the amount of said alcohol is increased, there is achieved a decrease in the balanced hardness of the agglomerate of said sterically hindered phenol antioxidant formed therewith, and as the amount of said alcohol is decreased, there is achieved an increase in the balanced hardness of the agglomerate of said sterically hindered phenol antioxidant formed therewith;

(b) contacting a mixture of a second portion of said sterically hindered phenol antioxidant and a secondary phosphite antioxidant with an amount of said processing aid consisting essentially of solvent, alcohol, and sterically hindered phenol antioxidant sufficient to form a paste thereof;

(c) agglomerating the resulting paste of said sterically hindered phenol antioxidant and said secondary phosphite antioxidant so as to form agglomerates thereof; and (d) drying the resulting agglomerates of said sterically hindered phenol antioxidant and said secondary phosphite antioxidant so as to form dried agglomerates thereof having a balanced hardness which is inverse to the amount of alcohol present in the processing aid.

In accordance with a further embodiment of the present invention, I have discovered that the balance of hardness properties of the agglomerated sterically hindered phenol antioxidant or of the agglomerated mixture of a sterically hindered phenol antioxidant and a secondary phosphite antioxidant can be appropriately modified by the adjustment of the concentration of the alcohol in the processing aid being utilized for the formation of the agglomerate.

Thus by the present invention, there is provided a process for the production of spherical agglomerates having a controlled balanced hardness by varying the amount of alcohol in the processing aid such that as the amount of the alcohol added is increased, there is achieved a decrease in the balanced hardness of the agglomerate formed therewith and as the amount of the alcohol is decreased, there is achieved an increase in the balanced hardness of the agglomerate formed with the processing aid.

While any solvent which is capable of dissolving the particular sterically hindered phenol antioxidant which is desired to be agglomerated can be employed in forming the processing aid, in the practice of this invention a presently preferred solvent is one selected from the group consisting of methylchloride, chloroform, toluene, acetone, methylethylketone, xylene, cyclohexane, styrene, methylcyclohexane, and hexane. The presently preferred solvents are acetone and methyethylketone.

In carrying out the process of the present invention, the processing aid system will contain from 20–50 weight percent of an alcohol of the formula ROH wherein R is an alkyl group of 1 to 8 carbon atoms. Through the controlled concentration of the alcohol in the processing aid utilized for the forming of a paste of the sterically hindered phenol antioxidant, there is achieved a continuing modification of the hardness of the resulting agglomerates such that as the percent content of the alcohol in the system increases, there is affected a decrease in the hardness value of the agglomerate thus permitting the custom formation of an antioxidant agglomerate having a predetermined hardness such that there is a balance between that hardness required for the avoiding of abrasion and thus dust and that hardness which will permit the ready dispersion of the agglomerated antioxidant in the host plastic for same. Thus, the effect of the alcohol in the processing aid is inverse to the amount of alcohol present in the solvent/alcohol system.

Presently preferred alcohols for use in the practice of the present invention is one selected from the group consisting of methanol, ethanol, and isopropanol. The alcohol of particular preference at this time is methanol.

The antioxidants of the sterically hindered phenol type are well known for organic materials and are frequently used for the stabilization of polymers such as polyethylene and polypropylene. Such compounds preferably contain at least one group of the formula:

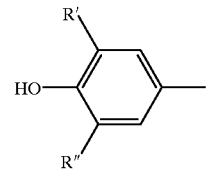

in which R' is hydrogen, methyl or tert-butyl and R" is unsubstituted or substituted alkyl or substituted alkylthioalkyl.

Suitable sterically hindered phenol type antioxidants useful in the practice of the present invention are those selected from the group consisting of alkylated monophenols, alkylthiomethylphenols, hydroquinones, alkylated hydroquinones, tocophenols, hydroxylated thiodiphenyl ethers, alkylidene bisphenols, o, s, and s-benzyl compounds, hydroxybenzylated malonates, hydroxybenzyl aromatics, triazines, benzylphosphonates, acylaminophenols, esters of β-(5tert-butyl-4-hydroxy-3-methylphenyl) propionic acid, esters of β-(3,5-dicyclohexyl-4-hydroxyphenyl)-propionic acid, esters of 3,5-di-tert-butyl-4-hydroxyphenylacetic acid, and amides of β-(3,5-di-tert-butyl-4-hydroxyphenyl) propionic acid.

Presently preferred sterically hindered phenol antioxidants for the practice of the present invention is one selected from the group consisting of:

octadecyl 3,5-di-t-butyl-4-hydroxyhydrocinnamate, tetrakis [methylene(3,5-di-t-butyl-4-hydroxylhydrocinnamate)]methane, 1,3,5-trimethyl-2,4,6-tris-(3,5-di-t-butyl-4-hydroxybenzyl)benzene, 1,3,5-tris-(3,5-di-t-butyl-4-hydroxybenzyl) isocyanurate, 1,3,5-tris-(4-t-butyl-3-hydroxy-2,6-dimethylbenzyl)-1,3,5-triazine-2,4,6- (1H, 3H, 5H) trione, and thiodiethylbenebis-(3,5-di-t-butyl-4-hydroxy) hydrocinnamate.

Presently the most preferred antioxidant for the practice of this invention is 1,3,5-trimethyl-2,4,6-tris-(3,5-di-tert-butyl-4-hydroxybenzyl) benzene. Such antioxidant is a product of Albemarle Corporation and available under the trademark ETHANOX® 330 Antioxidant.

As used herein the term "plastic" is intended to mean organic polymers such as the olefin polymers of ethylene and propylene or mixtures thereof with other olefin monomers.

As used herein the term "agglomerate" is intended to mean a small, rounded, or spherical body of a sterically hindered phenol antioxidant which has been produced through the agglomeration of same as in an agglomerator such as a pin agglomerator. Such agglomerates are typically spherical. Such materials are readily formed by a wide variety of agglomerating apparatus which are well known to those in the art and as such, the particular agglomerator employed is not critical to the practice of the present invention. One such suitable agglomerator is a pin agglomerator available from Feeco International (Green Bay, Wis.).

The term "processing aid" as used in the description of the present invention means the mixture formed by dissolving in the selected solvent at least 1 gram of antioxidant per 100 mL of solvent. Such a solution will have from 20 to 50 weight percent of an alcohol having the formula ROH wherein R is a alkyl group of 1 to 8 carbon atoms.

The term "balanced hardness" is intended to mean the hardness of an agglomerate of a sterically hindered phenol antioxidant which is required to permit the handling so as to avoid abrasion in conventional dispensing and metering systems while at the same time permitting the agglomerate to be readily dispersed in a host plastic in conventional dispersing systems such as a compounding extruder.

Through the practice of the present invention, there is provided a process for the production of novel agglomerates comprising a sterically hindered phenol antioxidant or a mixture of antioxidant and secondary phosphite which exhibit a controlled hardness and which avoid the introduction of extraneous materials into the additive formulation.

Through the use of controlled amounts of the alcohol to the processing aid, there is achieved a control of the friability or hardness of the ultimately produced agglomerate.

While in one presently preferred embodiment of this invention, there is provided an agglomerated product of ETHANOX® 330 Antioxidant which has a balance of hardness so as to permit transportation while being readily dispersed in the compounding of same in organic polymers. It will be appreciated that other antioxidants can likewise be employed in the practice of this invention either alone or in combination with other selected ingredients or coadditives. Thus, through the process of this invention, there can be produced customized additive systems having a balance of hardness which employ the selected sterically hindered phenolic antioxidant either alone or in combination with phosphite and, optionally, other desired additives for introduction into the host organic polymer.

The amount of the antioxidant of the sterically hindered phenol type in the agglomerates of the present invention will depend on the intended use of the agglomerated additive system. Thus, the agglomerates of this invention can consist of 100% by weight of sterically hindered phenol antioxidant. However, when formed in admixture with other components of a desired additive system the agglomerates should contain at least about 20% by weight of the sterically hindered phenol antioxidant.

Besides the sterically hindered phenol antioxidant, the agglomerates of this invention can also contain a secondary phosphite antioxidant such as phosphites, phosphonites, and fluoro-phosphonites. The amount of such secondary phosphite antioxidant will depend on the intended use of the agglomerated additive system. Thus, the agglomerates can contain from 0 to about 80%, preferably from about 3 to about 70% by weight, of such secondary phosphite antioxidants. Examples of suitable secondary phosphite antioxidants are:

2,2'-ethylidenebis-(4,6-di-t-butylphenyl)-fluorophosphonite, 2,2',2"-nitro[triethyl-tris(3,3',5,5'-tetra-t-butyl-1,1'-biphenyl-2,2'-diyl)] phosphite, tris(2,4-di-t-butylphenyl) phosphite, bis(2,4-di-t-butylphenyl)pentaerythritol-di-phosphite, and tetrakis (2,4-di-t-butylphenyl)-4,4'-biphenylenediphosphonite.

When in addition to the sterically hindered phenol antioxidant there is employed a secondary phosphite antioxidant, the weight ratio between the sterically hindered phenol antioxidant and the secondary phosphite antioxidant is within the range of from about 20:1 to about 1:5 and preferably from about 2:1 to about 1:4.

In addition, the agglomerates of the present invention can optionally contain a compound from the series consisting of the hydrotalcites, metal carbonates, and metal oxides. Such compounds are well known for achieving acid neutralization in an additive system. When so used in combination with the sterically hindered phenol antioxidant, such further component can be present in an amount in the range of from 0 to about 80 percent by weight.

Hydrotalcites are well known and commercially available from Kyowa Chemical Company of Japan, for example under the trade mark DHT-4V.

Presently preferred metal oxides are the oxides of divalent metals. Such compounds include the oxides of zinc and magnesium.

Presently preferred metal carbonates are the carbonates of divalent metals. Such compounds include the carbonate of calcium.

Other compounds which can be included in the additive pellet system of this invention include those plastic additives selected from the group consisting of metal soaps, antistatics, antiblocking agents, flame proofing agents, thioesters, internal and external lubricants, pigments, UV absorbers, and light stabilizers.

The initial dissolving of antioxidant into the selected solvent system can be carried out separately from the total antioxidant mass to be agglomerated in accordance with the present invention, or the processing aid can be added to the antioxidant powder in an amount such that at least 1 gram of antioxidant per 100 mL of processing aid is dissolved in the processing aid. The resulting solution is brought in situ into contact with the remaining antioxidant powder so as to effect the formation of a paste of the antioxidant which is suitable for agglomeration. Typically, the concentration of the solvent processing aid (i.e., selected solvent plus alcohol) required to form the paste which is suitable for agglomeration ranges from about 3 parts by weight solvent processing aid per 97 parts by weight of additive powder (i.e., phenolic antioxidant plus optionally secondary phosphite antioxidant and acid neutralizer) to about 20 parts by weight of solvent processing aid per 80 parts by weight of additive powder.

EXAMPLES

The following examples are intended to be illustrative of the present invention and to teach one of ordinary skill how to make and use the invention. These examples are not intended to limit the invention in any way.

In the examples which follow, all proportions of materials are given in parts by weight. Unless noted otherwise, the agglomeration process was performed by: 1) adding the indicated proportions of the processing aid liquid and of the additive powder to a glass Erlenmeyer flask; 2) admixing the materials of Step (1) with a spatula until a paste-like slurry formed; 3) rotating the flask at about 60 rpm with a roto-evaporator head while simultaneously tapping the flask gently with the fingers (to simulate the tumbling action of a drum or pin agglomerator apparatus) to affect the agglomeration into spherical particles; 4) transferring the agglomerated particles to a petri dish for drying in a forced-air oven at the indicated temperature. In those cases where the "additive powder" of Step (1) comprised a mixture of two or more powder components, the powder mixture was dry blended prior to adding the processing aid liquid.

In addition, process ability testing or agglomerate hardness measurements to determine the process ability characteristics of the agglomerates, i.e. hardness and attrition resistance, was determined by subjecting the agglomerates to manual manipulation so as to observe the friability of the agglomerates.

Example I

Agglomerate of ETHANOX® 330 Antioxidant Prepared with Toluene/Ethanol

The processing aid liquid (A) was prepared by admixing ETHANOX® 330 Antioxidant powder (10 parts), toluene (47.2 parts), and denatured ethanol (42.8 parts). The agglomeration process was performed on 1 part (A) admixed with 5 parts of additional ETHANOX® 330 Antioxidant powder. The resulting agglomerated particles were dried for about 20 minutes in the oven beginning at about 70° C. and gradually increasing the temperature to about 115° C. The dried agglomerate consisted of essentially spherical particles ranging from about 1 mm to about 4 mm in diameter. The resulting dried agglomerate particles were subjected to manual characterization and judged to have very good hardness and therefore good resistance to particle attrition during conveying operations.

For comparative purposes, the ETHANOX® 330 Antioxidant power was agglomerated under the same conditions as above described but with two different processing aid liquids (B) and (C). Processing aid liquid (B) was a saturated solution of ETHANOX® 330 Antioxidant dissolved in denatured ethanol, and processing aid liquid (C) consisted of 10 parts of ETHANOX® 330 Antioxidant dissolved in toluene. With (B), the wet agglomerated spherical particles that formed mostly disintegrated into fine powder during the drying operation, and the few dried spherical particles that remained were extremely soft and exhibited very low abrasion resistance. With (C), the tumbling action of the agglomeration apparatus failed to produce the desired spherical particles, leaving an essentially continuous slurry mass instead. This comparative example illustrates that the processing liquid aid of the instant invention is necessary both to form the desired spherical agglomerated particles and to impart the desired hardness to the dried agglomerated particles.

Example II

Agglomerate of ETHANOX® 330 Antioxidant Blend with Secondary Phosphite Antioxidant The agglomeration process with agglomeration aid (A) of Example I was essentially repeated but with the powder component replaced with a blend consisting of ETHANOX® 330 Antioxidant powder (1 part) and IRGAFOS 168 Phosphite powder (1 part) (tris-(2,4-di-tert-butylphenyl) phosphite), (a commercial secondary phosphite antioxidant product obtained from Ciba Specialty Chemicals). The dried agglomerate particles thus obtained were essentially spherical in shape, were nominally about 1 to about 4 mm in diameter, and when subjected to manual manipulation were judged to have very good hardness and therefore good resistance to particle attrition during conveying operations.

Example III

Agglomerate of IRGANOX 1010 Blend with Secondary Phosphite

The processing aid liquid (D) was prepared by admixing IRGANOX 1010 Antioxidant powder (pentaerytityl ester of β-(3,5-di-tert- butyl-4-hydroxyphenyl) propionic acid) (6 parts), (a commercial hindered phenolic antioxidant obtained from Ciba Specialty Chemicals), acetone (47 parts), and methanol (47 parts). Processing aid liquid (E) was prepared by admixing IRGANOX 1010 (6 parts), acetone (70.5 parts), and methanol (23.5 parts). A powder blend consisting of equal parts by weight of IRGANOX 1010 and IRGAFOS 168 (tris-(2,4-di-tert-butylphenyl) phosphite) (a commercial secondary phosphite antioxidant product obtained from Ciba Specialty Chemicals) was also prepared. The agglomeration of the powder blend was affected by utilizing 0.55 parts of agglomeration aid liquid with 5 parts of blended powder followed by drying in the oven at 71° C. for 30 minutes. The dried agglomerate particles thus obtained with processing aid liquids (D) and (E) were essentially spherical in shape, were nominally about 1 to about 4 mm in diameter, and when subjected to manual manipulation were judged to have very good hardness and therefore good resistance to particle attrition during conveying operations. Moreover, the agglomerate particles made with processing aid (E) were considerably harder than those with processing aid (D), thereby demonstrating that the hardness of the agglomerated particles is increased as the proportion of alcohol in the agglomeration aid liquid is decreased.

Example IV

Agglomerate of ETHANOX® 330 Prepared with Acetone/Methanol

The processing aid liquid (F) was prepared in the same manner as the processing aid liquid (D) of Example III except ETHANOX® 330 Antioxidant powder was substituted for the IRGANOX 1010 Antioxidant powder. ETHANOX® 330 Antioxidant powder was agglomerated with processing aid liquid (F) and subsequently dried by repeating the procedures utilized in Example III. The dried agglomerate particles of ETHANOX® 330 Antioxidant thus obtained were essentially spherical in shape, were nominally about 1 to about 5 mm in diameter, and when subjected to manual manipulation were judged to have very good hardness and therefore good resistance to particle attrition during conveying operations.

The specific examples herein disclosed are to be considered as being primarily illustrative. Various changes beyond those described will occur to those skilled in the art, and such changes are to be understood as forming a part of this invention as they fall within the spirit and scope of the appended claims.

What is claimed is:

1. A process for the production of agglomerates of a sterically hindered phenol antioxidant having a balanced hardness which comprises:
   (a) forming a processing aid by dissolving a first portion of said sterically hindered phenol antioxidant in a solvent system consisting essentially of at least one solvent of the group consisting of methylene chloride, chloroform, toluene, acetone, methylethylketone, xylene, cyclohexane, styrene, methylcyclohexane, and hexane and an alcohol of the formula ROH wherein R is an alkyl group of from 1 to 8 carbon atoms, said alcohol being present in amounts of from about 20 weight percent to about 50 weight percent of the processing aid;
   (b) forming a paste with the formed processing aid and a second portion of said sterically hindered phenol antioxidant;
   (c) agglomerating the resulting paste of said sterically hindered phenol antioxidant so as to form agglomerates thereof; and
   (d) drying the resulting agglomerates of said sterically hindered phenol antioxidant.

2. The process of claim 1 wherein said processing aid consists of from about 20 to about 50 weight percent of said alcohol and from about 50 to 80 weight percent of solvent for said sterically hindered phenol antioxidant.

3. A process of claim 1 wherein said sterically hindered phenol is one that contains at least one group of the formula:

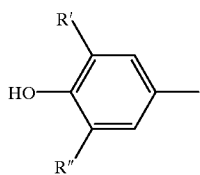

wherein R' is hydrogen, methyl or tert-butyl and R" is unsubstituted or substituted alkyl or substituted alkylthioalkyl.

4. The process of claim 2 wherein said sterically hindered phenol is at least one compound selected from the group consisting of alkylated monophenols, alkylthiomethylphenols, hydroquinones, alkylated hydroquinones, tocophenols, hydroxylated thiodiphenyl ethers, alkylidene bisphenols, o, s, and s-benzyl compounds, hydroxybenzylated malonates, hydroxybenzyl aromatics, triazines, benzylphosphonates, acylaminophenols, esters of β-(5 tert-butyl-4-hydroxy-3-methylphenyl) propionic acid, esters of β-3,5-dicyclohexyl-4-hydroxyphenyl) propionic acid, esters of 3,5-di-tert-butyl-4-hydroxyphenylacetic acid, and amides of β-(3,5-di-tert-butyl-4-hydroxyphenyl) propionic acid.

5. The process of claim 3 wherein said sterically hindered phenol antioxidant is a member of the group consisting of octadecyl 3,5-di-t-butyl-4-hydroxyhydrocinnamate, tetrakis [methylene(3,5-di-t-butyl-4-hydroxylhydrocinnamate)]methane, 1,3,5-trimethyl-2,4,6-tris-(3,5-di-t-butyl-4-hydroxybenzyl)benzene, 1,3,5-tris-(3,5-di-t-butyl-4-hydroxybenzyl) isocyanurate, 1,3,5-tris-4-t-butyl-3-hydroxy-2,6-dimethylbenzyl)- 1,3,5-triazine-2,4,6-(1H, 3H, 5H) trione, thiodiethylbenebis-(3,5-di-t-butyl-4-hydroxy) hydrocinnamate, and 1,3,5-trimethyl-2,4,6-tris-(3,5-di-t-butyl-4-hydroxybenzyl) benzene.

6. The process of claim 1 wherein said sterically hindered phenol antioxidant is 1,3,5-trimethyl-2,4,6-tris(3,5-di-tert-butyl-4-hydroxybenzyl) benzene.

7. The process of claim 1 wherein said alcohol is selected from the group consisting of methanol, ethanol, and isopropanol.

8. The process of claim 1 wherein said solvent is acetone and said alcohol is methanol.

9. The process of claim 1 wherein said solvent is methylethylketone and said alcohol is methanol.

10. The process of claim 1 wherein there is additionally present in said second portion of said sterically hindered phenol a secondary phosphite antioxidant.

11. The process of claim 9 where the ratio of said sterically hindered phenol to said secondary phosphite antioxidant is in the range of about 1:20 to about 5:1.

12. The process of claim 9 wherein there is additionally present an acid neutralizer.

13. The process of claim 11 wherein said acid neutralizer is selected from the group consisting of a metal oxide, a metal carbonate, and a hydrotalcite.

14. The process of claim 11 wherein said acid neutralizer is a hydrotalcite.

15. The agglomerated sterically hindered phenol antioxidant product of the process of claim 1.

16. The agglomerated sterically hindered phenol antioxidant product of the process of claim 10.

17. The process of claim 1 wherein said sterically hindered phenol antioxidant is pentaeryirityl ester of β-(3,5-di-tert-butyl-4-hydroxy phenyl) propionic acid.

* * * * *